United States Patent
Singhal et al.

(10) Patent No.: US 11,706,122 B2
(45) Date of Patent: Jul. 18, 2023

(54) COMPRESSION OF ROUTE TABLES USING KEY VALUES

(71) Applicant: VMWARE, INC., Palo Alto, CA (US)

(72) Inventors: Ravi Singhal, Pune (IN); Manish Malik, Pune (IN); Ganesh Jayvant Wagle, Pune (IN); Yusuf Batterywala, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/195,724

(22) Filed: Mar. 9, 2021

(65) Prior Publication Data
US 2022/0217072 A1 Jul. 7, 2022

(30) Foreign Application Priority Data
Jan. 5, 2021 (IN) .............................. 202141000397

(51) Int. Cl.
*H04L 1/00* (2006.01)
*H04L 45/021* (2022.01)

(52) U.S. Cl.
CPC .................................. *H04L 45/021* (2013.01)

(58) Field of Classification Search
CPC ............... H04L 45/021; H04L 63/0428; H04L 63/0485; H04L 69/04; H04L 45/74
See application file for complete search history.

(56) References Cited

U.S. PATENT DOCUMENTS

| | | | | |
|---|---|---|---|---|
| 6,385,649 B1* | 5/2002 | Draves | .................... | H04L 45/02 709/224 |
| 6,888,838 B1* | 5/2005 | Ji | .......................... | H04L 45/00 370/392 |
| 8,036,126 B2 | 10/2011 | Shaikh et al. | | |
| 10,157,291 B1* | 12/2018 | Kenthapadi | ........... | H04L 63/102 |
| 11,048,699 B1* | 6/2021 | Grider | ................. | G06F 16/2272 |
| 2002/0172203 A1* | 11/2002 | Ji | .......................... | G06F 16/902 370/395.31 |
| 2005/0111494 A1* | 5/2005 | Kecskemeti | ........ | H04L 61/6004 370/395.52 |
| 2009/0012957 A1* | 1/2009 | Villaret | ..................... | G06F 7/02 |
| 2010/0208744 A1* | 8/2010 | Shaikh | .................... | H04L 45/02 370/408 |
| 2011/0122893 A1* | 5/2011 | Kang | ..................... | H04L 69/22 370/477 |
| 2011/0307656 A1* | 12/2011 | Hamdi | ................ | H04L 45/7453 711/108 |
| 2013/0088999 A1* | 4/2013 | Thubert | .............. | H04W 40/248 370/254 |
| 2013/0097380 A1* | 4/2013 | Colgrove | ............ | G06F 16/1752 711/E12.017 |
| 2013/0173823 A1* | 7/2013 | Mann | ..................... | G06F 11/00 709/240 |

(Continued)

*Primary Examiner* — Abdelnabi O Musa

(57) ABSTRACT

Described herein are systems, methods, and software to manage the compression of route tables for communication between networking elements. In one implementation, a network device identifies network keys for a route table by replacing attributes in the tables with values. The network device further generates a compressed route table using the route keys and associating each of the route keys with one or more additional attributes. The network device also generates a dictionary to associate each of the values for the route keys to a corresponding attribute of the attributes.

19 Claims, 6 Drawing Sheets

(56) References Cited

U.S. PATENT DOCUMENTS

| | | | |
|---|---|---|---|
| 2015/0256450 A1* | 9/2015 | Yang | H04L 12/44 |
| | | | 370/256 |
| 2015/0278268 A1* | 10/2015 | El-Ali | G06F 16/245 |
| | | | 707/741 |
| 2017/0180252 A1 | 6/2017 | Mosko et al. | |
| 2020/0117649 A1* | 4/2020 | Arnold | G06F 11/1076 |

* cited by examiner

RT 120 ↘

| ROUTE TYPE 210 | NETWORK 211 | R PORT ID 212 | NEXT HOP IP 213 | R COMP ID 214 | R COMP TYPE 215 |
|---|---|---|---|---|---|
| ROUTE | 65.2.73.244/31 | d469ecf0-d075-4c2a-8e67-0c373124c563 | 200.2.0.201 | 48e8cdda-a15c-4b8c-865b-0c71f9d0374c | SERVICE_ROUTER_TIER0 |
| ROUTE | 65.2.73.246/31 | d469ecf0-d075-4c2a-8e67-0c373124c563 | 200.2.0.201 | 48e8cdda-a15c-4b8c-865b-0c71f9d0374c | SERVICE_ROUTER_TIER0 |
| ROUTE | 65.2.74.148/31 | d469ecf0-d075-4c2a-8e67-0c373124c563 | 200.2.0.201 | 48e8cdda-a15c-4b8c-865b-0c71f9d0374c | SERVICE_ROUTER_TIER0 |
| ROUTE | 65.7.27.174/31 | 08c98dc2-6112-40ab-9b93-428add93eb3e | 200.0.0.201 | 6031c8c4-ffab-4887-931b-35d8e7a4e466 | DISTRIBUTED_ROUTER_TIER0 |

FIGURE 2

COMPRESSED RT 122

| ROUTE TYPE KEY VALUE 310 | ROUTE KEYS 320 | | | ROUTE ATTRIBUTES 321 | |
| --- | --- | --- | --- | --- | --- |
| | R PORT ID KEY VALUE 311 | R COMP ID KEY VALUE 312 | R COMP TYPE KEY VALUE 313 | NEXT HOP IP 314 | NETWORK PREFIX 315 | NETWORK IP 316 |
| 1 | 1 | 1 | 1 | 3355574473 | 31 | 65.2.73.244; 65.2.73.246; 65.2.74.148 |
| 1 | 2 | 2 | 2 | 3355443401 | 31 | 65.7.27.174 |

FIGURE 3

DICTIONARY 124

| VALUE 410 | ROUTE TYPE TRANSL 420 | R PORT ID TRANSL 421 | R COMP ID TRANSL 422 | R COMP TYPE TRANSL 423 |
|---|---|---|---|---|
| 1 | ROUTE | d469ecf0-d075-4c2a-8e67-0c3731 24c563 | 48e8cdda-a15c-4b8c-865b-0c719d0374c | SERVICE_ROUTER_TIER0 |
| 2 |  | 08c98dc2-6112-40ab-9b93-428add93eb3e | 6031c8c4-ffab-4887-931b-35d8e7a4e466 | DISTRIBUTED_ROUTER_TIER0 |

FIGURE 4

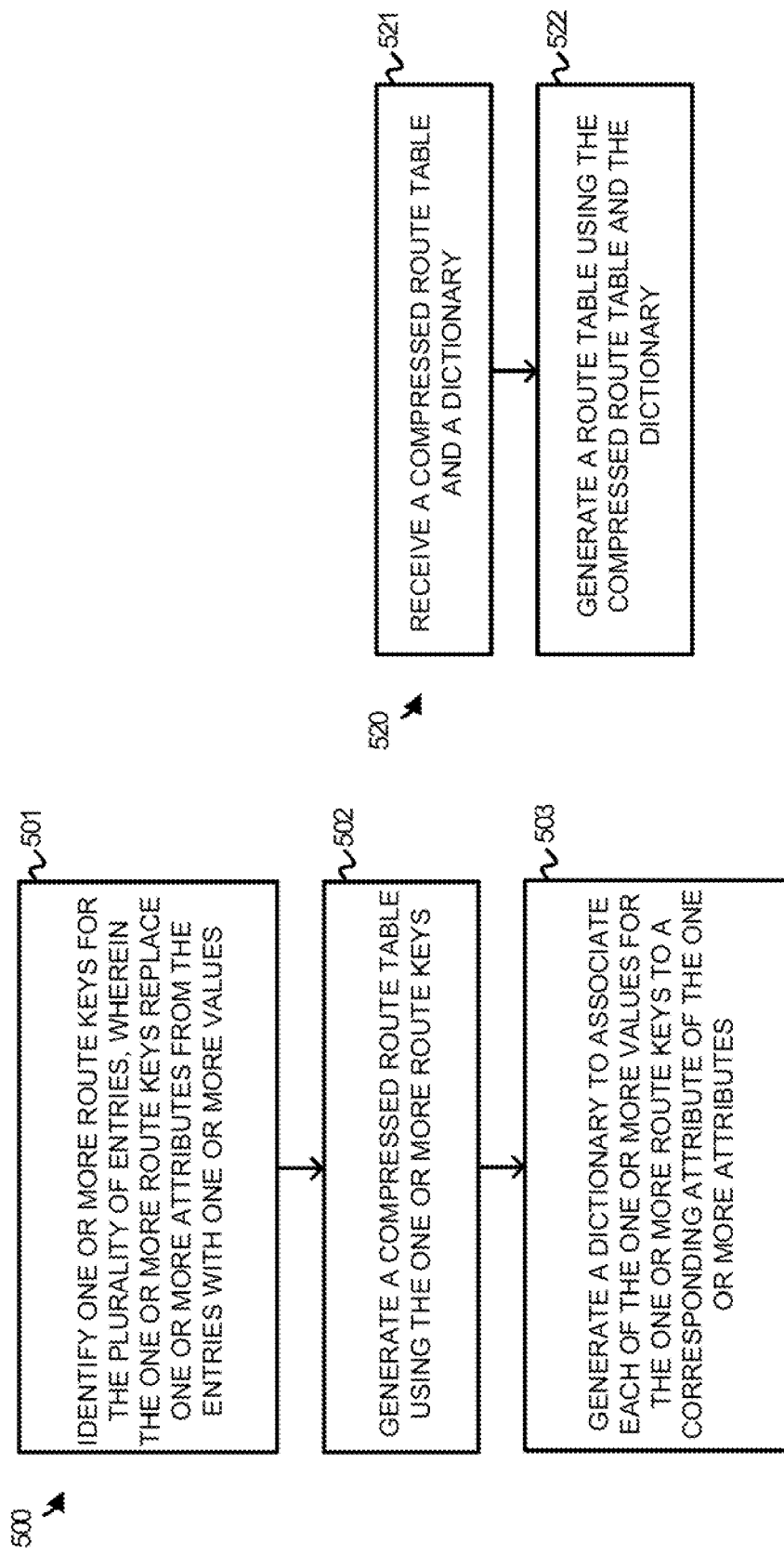

COMPRESSION OF ROUTE TABLES USING KEY VALUES

RELATED APPLICATIONS

Benefit is claimed under 35 U.S.C. 119(a)-(d) to Foreign Application Serial No. 202141000397 filed in India entitled "COMPRESSION OF ROUTE TABLES USING KEY VALUES", on Jan. 5, 2021, by VMware. Inc., which is herein incorporated in its entirety by reference for all purposes.

BACKGROUND

In computing environments, routing elements may exchange routing and reachability information to provide network connectivity for computing elements. In some implementations, the exchange of information may include updates to route tables that can be used to identify next hops and direct packets to other routing elements in a computing network. The route tables or routing information bases (RIBs) may include entries that define route types, networks, port identifiers, next hop interact protocol (IP) addresses, routing component identifiers and types, or some other information associated with routing information. The information for the tables may be exchanged using border gateway protocol (BGP) or some other gateway protocol for exchanging the routing and reachability information.

As the route tables expand for the various routing elements in the network, the communication of the route tables may require additional resources. In particular, additional network bandwidth and processing resources may be required to communicate a route table from a first routing element to a second routing element. Moreover, as the route tables expand, processing the data tables to implement deduplication or other functionality may require additional computing resources.

OVERVIEW

The technology disclosed herein manages the distribution and compression of route tables between networking devices. In one implementation, a method of compressing a route table with a plurality of entries includes identifying one or more route keys for the plurality of entries, wherein the one or more route keys replace one or more attributes from the plurality of entries with one or more values. Once the route keys are identified, the method further provides generating a compressed route table using at least the one or more route keys and generating a dictionary to associate each of the one or more values for the one or more route keys to a corresponding attribute of the one or more attributes.

BRIEF DESCRIPTION OF THE DRAWINGS

FIG. 2 illustrates a route table according to an implementation.

FIG. 3 illustrates a compressed route table according to an implementation.

FIG. 4 illustrates a dictionary for use with a compressed route table according to an implementation.

FIG. 5 illustrates an operation of a network device to generate a compressed route table and dictionary according to an implementation.

FIG. 6 illustrates an operation of a network device to generate a route table from a compressed route table and dictionary according to an implementation.

DETAILED DESCRIPTION

Figure 1:
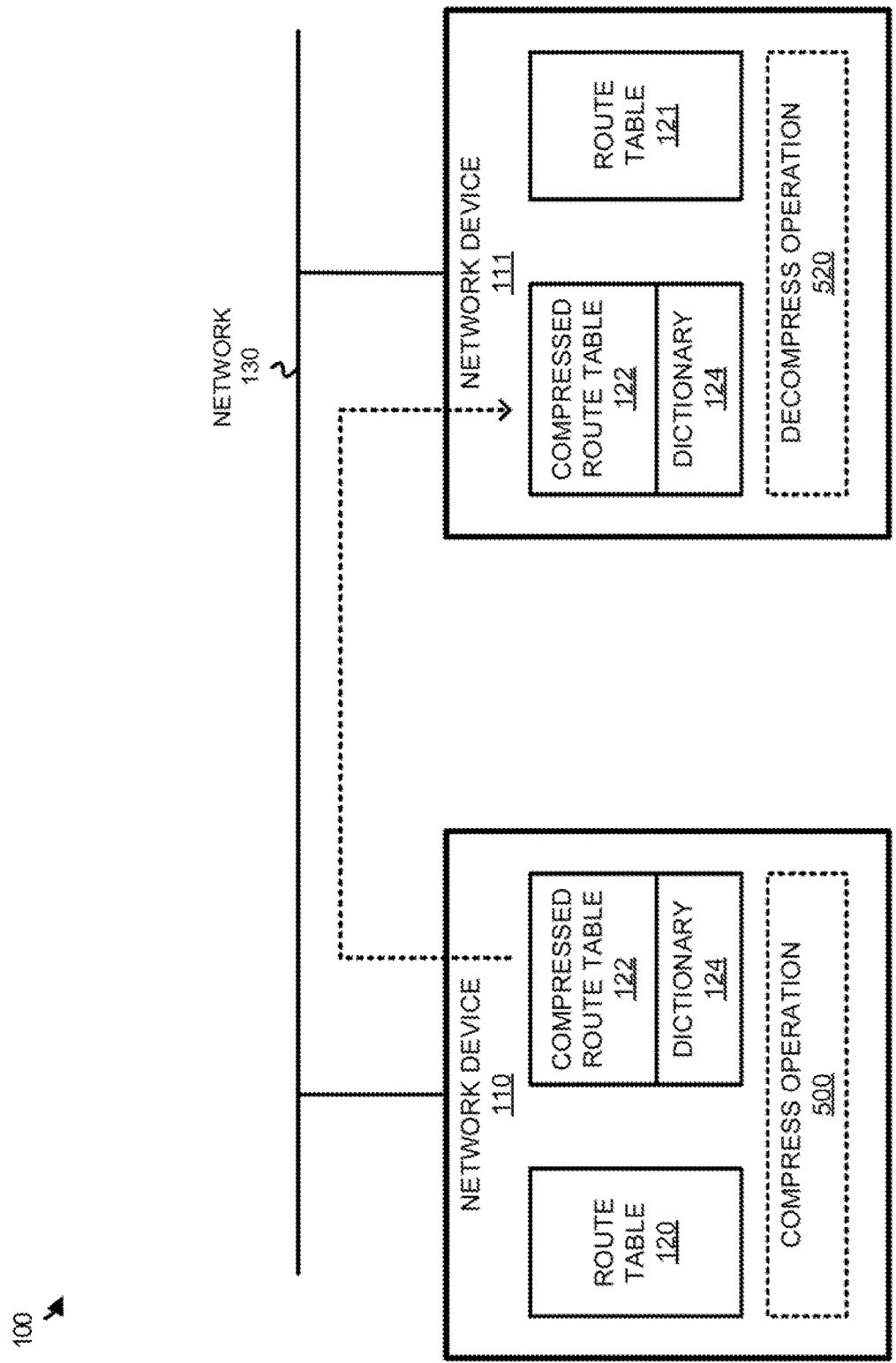
FIG. 1 illustrates a computing environment to exchange routing information between network devices according to an implementation.

FIG. 1 illustrates a computing environment 100 to exchange routing information between network devices according to an implementation. Computing environment 100 includes network devices 110-111 that communicate via network 130. Network device 110 includes route table 120, compressed route table 122, dictionary 124, and compress operation 500. Network device 111 includes compressed route table 122, dictionary 124, route table 121, and decompress operation 520. Compress operation 500 is further described below with respect to FIG. 5, while decompress operation 520 is further described below with respect to FIG. 6. Network devices 110-111 may comprise routers, a network host, or some other networking element, in some examples, network devices 110-111 may represent logical routers.

In operation, network device 110 maintains route table 120 that lists the routes to network destinations and includes information about the topology of the network for peers of network device 110. Each entry in route table 120 may indicate a route type, a network associated with the mute (network IP range), a routing port identifier, a next hop internet protocol (IP) address, a routing component identifier, a muting component type, or some other attribute associated with a route. Examples of entries in a route table are demonstrated as rows in expanded view of route table 120 in FIG. 2. When a packet is identified by network device 110, network device 110 may use the table to determine a route for the packet to deliver the packet to a destination computing node.

In some implementations, network device 110 may share route table 120 with other network devices, such as network device 111, wherein network device 111 may comprise a peer router, computing system, or other network device. The sharing of the route table may be used to update routes at network device 111 to reflect any configuration changes identified by network device 110. To efficiently communicate the route table, network device 110 may generate compressed route table 122 and dictionary 124 to provide to network device 111, such that a lesser amount of data may be required to be communicated between the devices. In generating compressed route table 122, network device 110 may identify attributes that are frequently shared between entries in the route table. For example, multiple entries in a route table may share a routing port identifier. Rather than communicating the same port identifier for each entry, a value may be used to replace the port identifier that requires less data than the port identifier. For example, a routing port identifier may comprise "d469ecf0-d075-4c2a-8e67-0c373124c563" and a replacement value for the compressed route table may be represented as a "1." Additionally, in dictionary 124, an entry may be used to associate the value, in the previous example "1," with "d469ecf0-d075-4c2a-8e67-0c373124c563." The attributes identified for replacement may be selected by the administrator, wherein the administrator may define one or more attribute types to be replaced as part of the compressed route table 122. The values that are used to replace the attributes may comprise numerical values, characters, or some combination thereof. The Values may also represent the attribute in a different format in some examples.

For each entry (row) in the route table, network device 110 may determine a route key, wherein the route key can include one or mote replacement values that replace one or more attributes in the entry. For example, an administrator may indicate that the route keys for the route table should replace five attribute types in the table. Once selected, network device 110 may process the route table for each of the attribute types to replace each unique attribute for the attribute type with a unique value. The unique values may then be associated with the attribute in the dictionary for the compressed table. Once the replacement values are determined for the five attribute types, a route key may be identified for each entry that includes the five values. The route keys for the route table entries may then be used in generating compressed route table 122, while dictionary 124 is used to translate the values to corresponding attributes.

In some implementations, multiple entries from route table 120 may share the same route key. Returning to the example of replacing five attributes with five values, multiple entries in the table may share the same attributes. Rather than using a unique entry in compressed route table 122 for each of the entries in route table 120, entries that share the same key may be compressed into a single entry. In particular, the compressed route table may include a key-value pair, where a route key may be associated with a "value" that comprises one or more attributes from the entries that share the route key and wore not used in the generating the route key. These one or more attributes may include a network prefix, a network IP, or some other attribute that can be used to reflect unique attributes associated with each of the entries that share a route key.

FIG. 2 illustrates a route table 120 according to an implementation. Route table 120 is an example route table that can be maintained by a network device, although other examples may exist. Route table 120 includes columns for route type 210, network 211, routing (R) port identifier 212, next hop IP 213, R component ID 214, and R component type. Each row in the table is representative of an entry, wherein the entry may be used to define routing information for packets received by the network device. In some examples the routing components or network devices may represent physical routing devices, but it should be understood that the routing component may represent a logical routing device in some examples.

FIG. 3 illustrates a compressed route table 122 according to an implementation. Compressed route table 122 is an example compressed route table derived from route table 120 depicted in FIG. 2. The rows in compressed mute table 122 represent entries for the compressed route table. Compressed route table 122 includes columns for route keys 320 and route attributes 321. Route keys 320 include columns for route type key value 310, R port identifier key value 311, R key value 312, R component type key value 313, and next hop IP 314. Route attributes 321 include network prefix 315 and network IP 316. Route attributes 321 are representative of attributes from route table 120 that are not used in the generation of the route keys.

As described herein, a network device or element may compress a route table to more efficiently communicate or store information associated with a route table. In generating compressed route table, the network device may determine route keys for the route table. In some implementations, the network device may identify and replace attributes in the route table with values. For example, for the route type all entries in route table 120 include the route type of "ROUTE" and a value may replace the type with a value of "1." If any other attribute existed in route type 210, other values mays be allocated to each of the unique attributes. The attributes that are replaced with different values may comprise attribute types that an administrator defined as part of the route key. Here, the attribute types selected from route table 120 for the route keys include route type 210, R port ID 212, R component ID 214, R component type 215, and next hop IP 213. The attributes for these attribute types are translated to values associated route type key value 310, R port identifier key value 311, R key value 312, R component type key value 313, and next hop IP 314, respectively. For example, referring to R component type 215, "SERVICE_ROUTER_TIER0" is translated to a value of "1" and "DISTRIBUTED_ROUTER_TIER0" is translated to a value of 2.

As each unique attribute in an attribute type is translated to a corresponding unique value, the combination of the one or more values for an entry may be used to define a route key. Referring to the first entry in compressed route table 122, the route key comprises "1, 1, 1, 1, 33555574473" and the route key is shared by multiple entries from route table 120. In particular, the first three entries in route table 120 share the same route key, permitting a single entry to represent the three entries. In addition to the route key, route attributes 321 provide the additional information associated with the entries, wherein attributes that are not used for the key may be provided for the various entries. Here, route attributes 321 includes network prefix 315 and network IP 311, which are both derived from network 211. Network prefix 315 indicates the length of the prefix while network IP 316 provides the prefix IP information. Because three entries from route table 120 are combined to a single entry in compressed route table 122, network IP 315 in the first entry includes three attributes derived from the three entries of route table 120. Although demonstrated in the example of FIG. 3 as consolidating entries from a route table into a single entry into the consolidated route table, it should be understood that the entries may be separated in some instances. Further, while demonstrated in the form of an IP address for each of the prefixes, it should be understood that the network device may update the format to conserve or compress the storage required for the IPs. For example, the network device may convert the IP address to a base ten numerical value, which can conserve storage for each of the IPs. Further, the receiving network device may return the value from the base 10 value to its original form when decompressing the table. In some implementations, rather than using the base 10 conversion or integer value, the network element may perform other conversions. As an example, the network element may convert a first IP address to an integer value and subsequent IP addresses in the table may be converted to indicate the difference from the previous IP address. Thus, a first IP address may be indicated as a first integer value, while the second IP address may be indicated as the difference between the first integer value and the second integer value for the second IP address.

In some implementations, rather than replacing attributes with values, compressed route table 122 may include the attributes. In particular, the network device may identify entries in route table 120 that include one or more of the same attributes in attributes of interest. These entries may be combined into a single entry in the compressed route table and the one or more shared attributes may be used as the route key. The route key may then be associated with remaining attributes for each of the entries in the compressed route table to provide the required information for each of the entries from the original route table.

FIG. 4 illustrates a dictionary 124 for use with a compressed route table according to an implementation. Dictionary 124 is representative of the dictionary for compressed route table 122 of FIG. 3. Dictionary 124 includes value 410, route type translation 420, R port identifier translation 421, R component ID translation 422, and R component type translation 423.

As route values are identified to replace the attributes from the original route table, dictionary 124 is generated that associates the unique values with the unique attributes. Here, the values "1" and "2" are used to replace the various attributes in the route table. The values are each associated with a corresponding attribute from the attributes in the route table. In particular, translations are used to translate the "1" and "2" into the route type, the R port identifier, the R component identifier, and the R component type.

In some implementations, at least a portion of the route key may not require a translation in the dictionary. For example, next hop IP 314 changes the next hop IP address from a first format to a second format to reduce the size. Accordingly, the reverse process may be used to expand the table, wherein the second format may be translated back from the second format (e.g., base 10 value) to the first value (IP format).

Once the compressed route table and dictionary is generated, the network device may store or communicate the compressed route table and dictionary to a second network device. This communication may further compress the table and dictionary using alternative compression methods associated with communicating the required data. After receiving the compressed route table and dictionary, the second network device may reassemble the route table, depicted as route table 121 in network device 111, may use the compressed route table and dictionary to provide duplication, or provide some other function in association with the compressed route table and dictionary.

FIG. 5 illustrates an operation 500 of a network device to generate a compressed route table and dictionary according to an implementation. The steps of operation 500 are referenced parenthetically in the paragraphs that follow and may reference back to portions of FIGS. 1-4. Operation 500 is performed by network device 110 in FIG. 1, however, it should be understood that network device 111 or other network devices may provide similar operations.

As depicted, operation 500 includes identifying (501) one or more route keys for the plurality of entries, wherein the one or more route keys replace one or more attributes from the plurality of entries with one or more values. In some implementations, a route entry in the route table may include a plurality of attributes, wherein entries may share one or more attributes with other entries in the table. For example, a plurality of route entries may share the same next hop IP address. To compress the route table, one or more attribute types may be selected to form the route key, wherein the network device may assign a unique value to replace unique attributes for each of the attribute types. As an example, in route table 120, R port identifier 212 includes two unique values. In generating the compressed route table, each of the R port identifiers may be replaced with a value (e.g., a "1" or a "2").

Once the values are replaced for the route keys, the network device may generate (202) a compressed route table using at least the one or more route keys. The route table may be used to associate each of the route keys with one or more other attributes that were not replaced by the route keys. Referring to compressed route table 122 in FIG. 3, two route keys were generated, wherein each of the route keys include multiple values that were used to replace multiple attributes. In addition to the route keys, one or more attributes that were not used in creating the route keys may be associated with the keys. Using the example in compressed route table 122, network prefix 315 and network 1P 316 may provide remaining information for the entries from route table 120.

In addition to generating the compressed route table, operation 500 further generates (503) a dictionary to associate each of the one or more values for the one or more route keys to a corresponding attribute of the one or more attributes. In one example, for dictionary 124, values "1" and "2" from the route keys can be translated to route type. R port identifier, R component identifier, or R component type. In some implementations, at least a portion of the route key may not require a translation from a table. Instead, formatting may be changed in association with the attribute to generate the value. For example, an IP address may be convened to a base 10 number to save storage in compressed route table 122. Rather than using the dictionary to translate a value, the conversion may be reversed to obtain the relevant IP address.

In some implementations, rather than using a dictionary, it should be understood that the compressed route table may use at least a portion the attributes from the original route table to populate the key values. In particular, while demonstrated as replacing the attributes form the route table with values of "1" and "2," at least a portion of the attribute types used for the key may use the full attribute from the original route table. For example, while dictionary 124 uses a route translation to translate the value "1" to "ROUTE" it should be understood that the attribute "ROUTE" may be included in the compressed route table.

Once the compressed route table and dictionary are generated by the network device, the network device may store the compressed route table and dictionary, may communicate the route table to a network monitoring service, or, as illustrated in computing environment 100, may communicate the route table to another.

FIG. 6 illustrates an operation 520 of a network device to generate a route table from a compressed route table and dictionary according to an implementation. The steps of operation 520 are referenced parenthetically in the paragraphs that follow with reference to elements from FIGS. 1-4.

In operation, network device 111 may receive (521) a compressed route table and dictionary from network device 110. The compressed route table and dictionary may be received via border gateway protocol (BGP) or some other protocol and may be received in a compressed file format in some examples. In response to receiving the compressed route table and dictionary, network device 111 generates (522) a route table using the compressed route table and the dictionary, wherein network device 111 may use values identified in the route keys for the compressed route table to identify attributes for the expanded route table.

In some implementations, network device 111 may identify values in the compressed route table that are associated with translations or lookups in the received dictionary. For example, for the route keys in route table 122 depicted in FIG. 3, the route type key value 310 for each of the keys is a "1." Once the value is identified, the translation in the dictionary may be used to indicate that the "1" corresponds to "ROUTE." The translation may then be used to populate the expanded route table. In some implementations, a route key in the compressed route table may correspond to multiple entries in the expanded route table. In particular, a route key may be associated in the compressed route table with attributes from multiple entries in the non-compressed route table. As a result, during expansion, the attributes associated with the different entries may be used to transition the single entry in the compressed route table into the multiple entries into the non-compressed route table.

Referring to an example in compressed route table 122 of FIG. 3, the first route key in route keys 320 is associated with multiple network IPs in network IP column 316. Each of these network IPs represents attributes from a different entry in the non-compressed route table 120. As a result, when compressed route table 122 is expanded, rather than a single entry, multiple entries may be added in the non-compressed table to represent the attributes.

In some implementations, at least a portion of the values in the route keys may not require a translation using the dictionary. These values may be the same as the attributes in the non-compressed route table or may comprise a different format of the attributes from the non-compressed route table. Rather than requiring a dictionary, the values in the different format may be converted back to the first format associated with the non-compressed version. Similar to the values in the route keys, at least a portion of the attributes in route attributes 321 may be placed in a second format that can be convened back to the first format of the non-compressed route table.

In some implementations, in addition to expanding the compressed route table to the original route table, computing system 700 may provide other operations using the compressed route table and/or the dictionary. In at least one example, computing system 700 may perform deduplication on routes using the compressed route table and may compare a received compressed route table to one or more other compressed route tables to identify differences or similarities between the tables.

Figure 7:
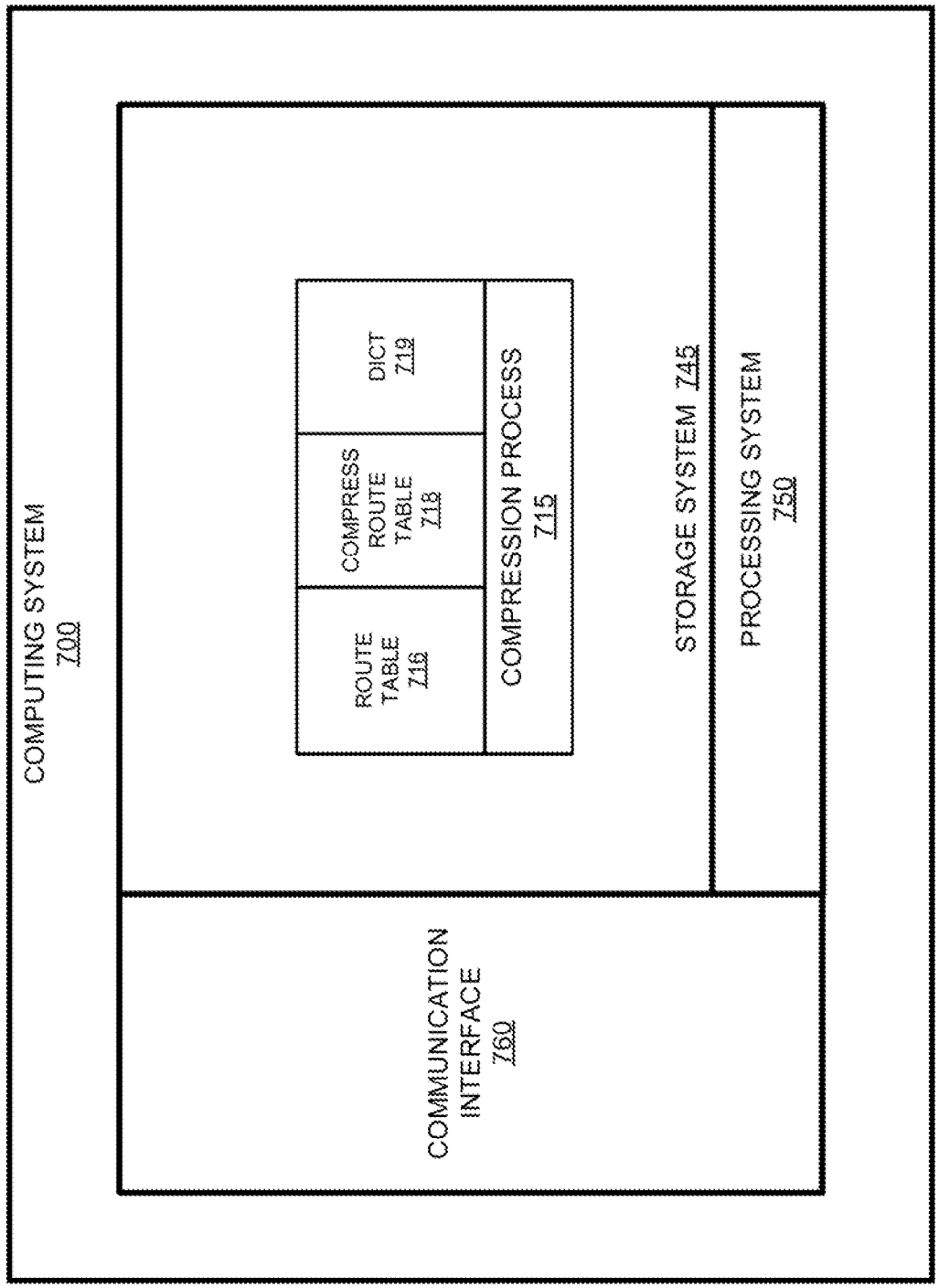
FIG. 7 illustrates a computing system to manage compressed route tables and dictionaries according to an implementation.

FIG. 7 illustrates a computing system 700 to manage compressed route tables and dictionaries according to an implementation. Computing system 700 is representative of any computing system or systems with which the various operational architectures, processes, scenarios, and sequences disclosed herein for a network device, such as a router, can be implemented. Computing system 700 is an example of network devices 110-111 of FIG. 1, although other examples may exist. Computing system 700 includes storage system 745, processing system 750, and communication interface 760. Processing system 750 is operatively linked to communication interface 760 and storage system 745. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with other network devices, such as a router, switch, end computing system, or some other computing element.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage systems 745 comprises computer programs, firmware, or some other form of machine-readable program instructions. The operating software of storage system 745 comprises compression process 715 that uses route table 716 to generate compressed route table 718 and dictionary 719. The operating software on storage system 745 may further include utilities, drivers, network interfaces, applications, or some other type of software. When read and executed by processing system 750 the operating software on storage system 745 directs computing system 700 to operate as described herein. In some implementations, compression process 715 may provide operation 500 described in FIG. 5 and operation 520 described in FIG. 6.

In at least one implementation, compression process 715 directs processing system 750 to identify one or more route keys for the plurality of entries, wherein the one or more route keys replace one or more attributes from the plurality of entries with one or more values, in a route table, entries may include a plurality of attributes that can include a route type, a R port identifier, a next hop IP address, a R component identifier, a R component type, or some other information. From the route table, computing system 700 may identify a request to generate a compressed route table that can consolidate entries in the route table into a single entry. In some implementations, one or more of the attribute types in the route table are selected to compress the route table.

Once selected, compression module 715 directs processing system 750 to, for each of the attribute types, identify unique attributes and assign the attributes a value. Once completed for all the attribute types, compression module 715 may identify keys for each of the entries by combining the values for that entry. For example, a configuration may use three attribute types to generate the route key. For an entry in the route table, the route key would comprise the combined values for the attributes associated with the three attribute types.

Once the route keys are identified for the entries in the route table, compression process 715 may generate compressed route table 718 using the route keys. In some implementations, multiple entries from mute table 716 may share the same route key. These entries may be combined into a single entry in compressed route table 718, wherein the route key may be associated with other attributes from the original entries in route table 716 that were not used for the route key. As an example, a route key may include attributes for route type, R port identifier, R component identifier, and R component type. The route key may then be associated in compressed route table 718 with other attributes that are not used in the key and that might be unique to each of the entries represented by the key. These attributes may include a next hop IP address, a network prefix or prefix size for the entry, a network IP address, or some other attribute. In some implementations, the attribute types that are selected for the route keys may be based on the likelihood of duplicate route keys in a route table.

In addition to generating the compressed route table, compression process 715 may generate a dictionary that is used to associate the replacement values used for the route keys with corresponding attributes. For example, a route table may include entries that use two R port identifiers. The values used in the compressed route table may include a "1" that is associated with the first port identifier and "2" associated with the second port identifier. The dictionary may be used to associate the values in the compressed route table to the original attributes, such that the original route table can be reassembled.

Once the compressed route table and the dictionary are generated, compression process 715 directs processing system 750 to communicate the compressed route table and the dictionary to a second network device, may store the compressed route table and dictionary locally at computing system 700, or may provide the compressed route table and dictionary to a monitoring service. When communicating the compressed route table and dictionary, compression process 715 may further compress the compressed route table and dictionary for transmission using a variety of compressed data format.

In some implementations, at least a portion of the route key may not require entries in the dictionary for translation. For example, IP addresses, such as next hop IP addresses, that are used as part of the route key may be placed in an alternative format, such as base 10 to preserve the storage required to store the IP address in the compressed route table. When the value is required to translated back to the original value to reassemble the route table, a computing system may implement a conversion to return the IP address to the original format. In some examples, similar operations may be performed on the attributes associated with the route keys in the compressed route table. Referring again to an IP address or an IP address prefix, the prefix may be translated to a different format prior to be stored in the compressed route table. Thus, rather than requiring translation from the dictionary, the attribute may be changed to the original format using format conversion.

Although described in the previous example as replacing the original attributes from the route table with values in the compressed route table, it should be understood that the keys may use one or more of the original attributes as part of the keys. As an example, rather than replacing attributes associated with a route type, computing system 700 may use the attribute, such as "ROUTE" as the value in the compressed route table. In some examples, only a portion of the route key may include original attributes, however, it should be understood that a route table may only include the additional attributes in some examples.

In some examples, computing system 700 may receive compressed route tables and dictionaries from one or more other networking devices or elements. When a compressed route table and dictionary is received, compression process 715 directs processing system 750 to expand the compressed route table using the lookups provided in the dictionary. For example, for a value identified in the compressed route table, compression process 715 may identify a location in the dictionary that corresponds to the value and use the associated attribute to reassemble the original route table. In some implementations, an entry in the compressed route table may be expanded to two or more entries in the original route table. In particular, the attributes associated with the route key may correspond to multiple entries from the original route table. Consequently, when expanded, the attributes may be separated from the compressed route table entry to apply the correct entries in the non-compressed or original route table.

In some implementations, in addition to expanding the compressed route table to the original route table, computing system 700 may provide other operations using the compressed route table and/or the dictionary. In at least one example, computing system 700 may perform deduplication on routes using the compressed route table and may compare a received compressed route table to one or more other compressed route tables.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed:

1. A method of compressing a route table with a plurality of entries, wherein each entry in the plurality of entries comprises a plurality of attributes, the method comprising:
identifying one or more route keys to replace one or more attributes in each of the plurality of entries, wherein the plurality of attributes comprises at least a next hop IP address, wherein the one or more route keys each comprise one or more values that replace a corresponding one or more attributes of the plurality of attributes for one or more entries of the plurality of entries;
generating a compressed route table comprising at least the one or more route keys;
generating a dictionary to associate each value of the one or more values for the one or more route keys to a corresponding attribute from the route table that said value replaced; and
communicating the compressed route table and the dictionary to a peer network device.

2. The method of claim 1, wherein generating the compressed route table comprises associating each of the one or more route keys with one or more second attributes from the plurality of entries not used for the one or more route keys.

3. The method of claim 1 further comprising:
compressing the compressed route table and the dictionary for communication to the peer network device.

4. The method of claim 1, wherein each entry in the compressed route table comprises a route key of the one or more route keys.

5. The method of claim 4, wherein at least one entry in the compressed route table represents two or more entries in the route table.

6. The method of claim 5, wherein the at least one entry associates a route key of the one or more route keys with second attributes of the plurality of attributes associated with the two or more entries not replaced by the one or more values of the route key.

7. The method of claim 1, wherein the plurality of attributes further comprise a route type, a routing port identifier, a routing component identifier, or a routing component type identifier.

8. The method of claim 1, wherein each of the one or more values for the one or more route keys requires a lesser amount of storage than a corresponding attribute from the route table said value replaced.

9. A computing apparatus comprising:
a storage system;
a processing system operatively coupled to the storage system; and
program instructions stored on the storage system to compress a route table with a plurality of entries that each comprise a plurality of attributes that, when executed by the processing system, direct the computing apparatus to:
identify one or more route keys to replace one or more attributes in each of the plurality of entries, wherein the plurality of attributes comprises at least a next hop IP address, wherein the one or more route keys each comprise one or more values that replace a corresponding one or more attributes of the plurality of attributes for one or more entries of the plurality of entries;
generate a compressed route table comprising at least the one or more route keys; and
generate a dictionary to associate each value of the one or more values for the one or more route keys to a corresponding attribute from the route table that said value replaced.

10. The computing apparatus of claim 9, wherein generating the compressed route table comprises associating each of the one or more route keys with one or more second attributes from the plurality of entries not used for the route keys.

11. The computing apparatus of claim 9, wherein the program instructions further direct the computing apparatus to communicate the compressed route table and the dictionary to a peer network device.

12. The computing apparatus of claim 11, wherein the program instructions further direct the computing apparatus to compress the compressed route table and the dictionary for communication to the peer network device.

13. The computing apparatus of claim 9, wherein each entry in the compressed route table comprises a route key of the one or more route keys.

14. The computing apparatus of claim 13, wherein at least one entry in the compressed route table represents two or more entries in the route table.

15. The computing apparatus of claim 14, wherein the at least one entry associates a route key of the one or more route keys with second attributes of the plurality of attributes associated with the two or more entries not replaced by the one or more values of the route key.

16. The computing apparatus of claim 9, wherein the plurality of attributes further comprise a route type, a routing port identifier, a routing component identifier, or a routing component type identifier.

17. The computing apparatus of claim 9, wherein each of the one or more values for the one or more route keys requires a lesser amount of storage than a corresponding attribute from the route table said value replaced.

18. A system comprising:
a plurality of network devices;
a first network device in the plurality of network devices configured to:
identify one or more route keys for each entry of a plurality of entries in a route table, wherein each of the plurality of entries comprises a plurality of attributes, wherein the one or more route keys each comprise one or more values that replace a corresponding one or more attributes of the plurality of attributes for one or more entries of the plurality of entries;
generate a compressed route table by associating each of the one or more route keys with one or more second attributes from the route table not replaced by the one or more values;
generate a dictionary to associate each value of the one or more values for the one or more route keys to a corresponding attribute from the route table that said value replaced; and
communicate the compressed route table and the dictionary to a second network device in the plurality of network devices.

19. The system of claim 18, wherein each of the one or more values for the one or more route keys requires a lesser amount of storage than a corresponding attribute from the route table said value replaced.

* * * * *